United States Patent
Herbig et al.

(10) Patent No.: US 9,293,151 B2
(45) Date of Patent: Mar. 22, 2016

(54) SPEECH SIGNAL ENHANCEMENT USING VISUAL INFORMATION

(75) Inventors: Tobias Herbig, Ulm (DE); Tobias Wolff, Ulm (DE); Markus Buck, Biberach (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 63 days.

(21) Appl. No.: 14/352,016

(22) PCT Filed: Oct. 17, 2011

(86) PCT No.: PCT/US2011/056552
§ 371 (c)(1),
(2), (4) Date: Apr. 15, 2014

(87) PCT Pub. No.: WO2013/058728
PCT Pub. Date: Apr. 25, 2013

(65) Prior Publication Data
US 2014/0337016 A1    Nov. 13, 2014

(51) Int. Cl.
*G10L 25/27*  (2013.01)
*G06K 9/00*   (2006.01)
(Continued)

(52) U.S. Cl.
CPC ............ *G10L 25/27* (2013.01); *G06K 9/00624* (2013.01); *G06T 7/0042* (2013.01);
(Continued)

(58) Field of Classification Search
CPC .... G10L 25/27; G10L 17/00; G06K 9/00624; G06T 7/0042; H04M 3/568
USPC .......................................................... 381/66
See application file for complete search history.

(56) References Cited

U.S. PATENT DOCUMENTS

| 5,940,118 A | 8/1999 | Van Schyndel |
| 6,483,532 B1 | 11/2002 | Girod |

(Continued)

FOREIGN PATENT DOCUMENTS

| EP | 1 005 250 A2 | 5/2000 |
| EP | 1 858 295 A1 | 11/2007 |

(Continued)

OTHER PUBLICATIONS

Hioka, Hirosuke JP 2011053062 Mar. 2011, Japan English Machine Language Translatiion (EMLT).*

(Continued)

*Primary Examiner* — Marivelisse Santiago Cordero
*Assistant Examiner* — Daryl Jackson
(74) *Attorney, Agent, or Firm* — Daly, Crowley Mofford & Durkee, LLP (57) ABSTRACT

Visual information is used to alter or set an operating parameter of an audio signal processor, other than a beamformer. A digital camera captures visual information about a scene that includes a human speaker and/or a listener. The visual information is analyzed to ascertain information about acoustics of a room. A distance between the speaker and a microphone may be estimated, and this distance estimate may be used to adjust an overall gain of the system. Distances among, and locations of, the speaker, the listener, the microphone, a loudspeaker and/or a sound-reflecting surface may be estimated. These estimates may be used to estimate reverberations within the room and adjust aggressiveness of an anti-reverberation filter, based on an estimated ratio of direct to indirect (reverberated) sound energy expected to reach the microphone. In addition, orientation of the speaker or the listener, relative to the microphone or the loudspeaker, can also be estimated, and this estimate may be used to adjust frequency-dependent filter weights to compensate for uneven frequency propagation of acoustic signals from a mouth, or to a human ear, about a human head.

17 Claims, 4 Drawing Sheets

(51) Int. Cl.
*G06T 7/00* (2006.01)
*H04M 3/56* (2006.01)
*H04R 3/00* (2006.01)
G10L 15/20 (2006.01)
G10L 17/00 (2013.01)
H04N 7/15 (2006.01)
G10L 25/78 (2013.01)
G10L 21/0208 (2013.01)

(52) U.S. Cl.
CPC .... *H04M 3/568* (2013.01); *G06T 2207/30196* (2013.01); *G10L 15/20* (2013.01); *G10L 17/00* (2013.01); *G10L 25/78* (2013.01); *G10L 2021/02082* (2013.01); *H04N 7/15* (2013.01)

(56) References Cited

U.S. PATENT DOCUMENTS

| | | | | |
|---|---|---|---|---|
| 7,856,353 | B2* | 12/2010 | Fukuda | G10L 15/20 381/63 |
| 8,213,646 | B2* | 7/2012 | Matsumoto | H04R 5/04 340/435 |
| 2002/0090094 | A1* | 7/2002 | Amir | H04R 3/00 381/92 |
| 2004/0240676 | A1* | 12/2004 | Hashimoto | H04R 5/02 381/56 |
| 2006/0165242 | A1* | 7/2006 | Miki | H04R 3/005 381/59 |
| 2007/0120966 | A1 | 5/2007 | Murai | |
| 2007/0160240 | A1* | 7/2007 | Ito | H04S 7/303 381/300 |
| 2007/0177744 | A1 | 8/2007 | Kirn | |
| 2009/0180633 | A1* | 7/2009 | Ishibashi | H04R 1/403 381/59 |
| 2009/0207233 | A1 | 8/2009 | Mauchly et al. | |
| 2009/0310795 | A1* | 12/2009 | Apsey | G10L 21/0208 381/71.1 |
| 2011/0182439 | A1* | 7/2011 | Sakurada | H04R 3/02 381/94.1 |
| 2011/0224979 | A1* | 9/2011 | Raux | G10L 15/07 704/233 |
| 2011/0243342 | A1* | 10/2011 | Ohashi | H04S 7/00 381/61 |

FOREIGN PATENT DOCUMENTS

| | | |
|---|---|---|
| EP | 1 860 911 A1 | 11/2007 |
| EP | 2 028 062 A2 | 2/2009 |
| JP | 2011053062 A * | 3/2011 |
| WO | WO 02/063599 A1 | 8/2002 |
| WO | WO 2006/129205 A1 | 12/2006 |
| WO | WO 2010/054373 A2 | 5/2010 |

OTHER PUBLICATIONS

PCT International Preliminary Report on Patentability for PCT/US2011/056552 dated May 1, 2014.
Jindong, et al: "A scene-associated training method for mobile robot speech recognition in multisource reverberated environments", Intelligent Robots and Systems (IROS), 2011 IEEE/RSJ International Conference ON, IEEE, Sep. 25, 2011, pp. 542-549, XP032060569, DOI: 10.1109/IROS.2011.6048587, ISBN: 978-1-61284-454-1.
Schmidt, et al.,: "Signal processing for in-car communication systems", Signal Processing, Elsevier Science Publishers B.V. Amsterdam, NL, vol. 86, No. 6, Jun. 1, 2006, pp. 1307-1326, XP005365816, ISSN: 0165-1684, DOI: 10.1016/J.SIGPRO.2005.07.040.
Notification of Transmittal of the International Search Report and the Written Opinion of the International Searching Authority, or the Declaration, PCT/US2011/056552, date of mailing Aug. 13, 2012, 8 pages.
Written Opinion of the International Searching Authority, PCT/US2011/056552, date of mailing Aug. 13, 2012, 21 pages.
European Application No, 11782489.6 Response dated Dec. 15, 2015 18 pages.
European Patent Application 11 782 489.6 Office Action dated Aug. 10, 2015, 6 pages.
Jirapom Pongsiri et al.: "Modeling the acoustic transfer function of a room", Proceedings of the 12th International Conference on Scientific Computing and Mathmatical Modeling, 1999.
Markus Guldenschuh: "Transaural Beamforming, Methods for Controllable Focused Sound Reproduction", Diploma Thesis, Sep. 2009.

* cited by examiner

SPEECH SIGNAL ENHANCEMENT USING VISUAL INFORMATION

CROSS REFERENCE TO RELATED APPLICATIONS

This application is a National Stage application of PCT/EP2011/056552 filed on Oct. 17, 2011, and entitled "SPEECH SIGNAL ENHANCEMENT USING VISUAL, INFORMATION".

TECHNICAL FIELD

The present invention relates to distant speech signal acquisition and, more particularly, to estimating distance, location and orientation of a human speaker based on visual information from a camera and using this information to influence processing of speech signals from the human speaker.

BACKGROUND ART

Many vehicles include automatic speech recognition (ASR) systems configured to control various subsystems within the vehicles, such as heaters and air-conditioners (collectively "cabin temperature controls"), power windows and mobile telephones. Such systems respond to commands uttered by human speakers ("speakers"), typically drivers, but also sometimes passengers. Environments within vehicles pose challenges for these ASR systems, at least in part due to sound reflections ("reverberations") from hard surfaces, such as glass windows, in close proximity to the speakers, as well as road noise and wind noise.

Some vehicles include intercom systems that amplify speech detected by microphones located near front seats and play the amplified speech through loudspeakers located near rear seats, to facilitate conversation between front-seat occupants and rear-seat occupants. However, direct sounds from the speakers, combined with delayed sounds from the loudspeakers, often interfere with understanding of the speech.

So-called "smart room" conference facilities include microphones and video cameras that enable conference participants in one location to converse with, see and be seen by participants in another such facility. The multitude of microphones located throughout each such facility can, however, pick up sounds other than speech of one person who currently "has the floor," thereby introducing noise into the audio stream.

Some home entertainment systems, such as television receivers, also include ASR systems to control volume, channel, source, etc. Similarly, some single- or multi-player games can be controlled by voice commands. Performance of entertainment, game and other systems that recognize or respond to voice commands is hampered by many of the same issues listed above.

Various techniques have been employed in attempts to improve microphone systems and front-end signal processing systems to ameliorate the problems summarized above. Some such attempts are described below.

A space in which an audio system is used may generically be referred to as a "room," and propagation of acoustic signals within a room may be modeled by an acoustic room transfer function (RTF). For example, Jiraporn Pongsiri, et al. discuss understanding and modeling room acoustics in "Modeling the acoustic transfer function of a room," Proceedings of the 12th International Conference on Scientific Computing and Mathematical Modeling, Chicago, Ill., pp. 44, 1999. Many audio systems include signal processors, such as filters, that are designed based on assumed or measured RTFs.

G. Schmidt and T. Haulick disclose limiting gain of rear loudspeakers in a vehicle, according to a delay between a primary source (e.g., a sound directly from a driver) and a secondary source (e.g., a sound from a loudspeaker in the rear of the vehicle) to avoid mislocalization of sounds by rear-seat passengers. E. Hänsler, G. Schmidt: Topics in Acoustic Echo and Noise Control, Springer 2006, Chapter 14 "Signal Processing for In-Car Communication Systems." However, the authors do not disclose or suggest how to detect such a delay. The authors merely describe an experiment in which such a delay was artificially created between two loudspeakers and subjects were asked to adjust volume of the delayed sound, relative to the non-delayed sound.

In "A multi-microphone approach to speech processing in a smart-room environment," Alberto Abad Gareta discloses using visual, audio or audio-visual information to estimate head orientation of a speaker to select microphones aimed at the speaker. See section 5.4 and pages 108 and 150.

Michael A. Casey, et al., disclose using a video camera to estimate location of a speaker and then steer a fixed beam-forming algorithm to the speaker. In addition, a stereo output is controlled, based on the location estimate, to improve a 3D-spatial audio output. Vision Steered Beam-forming and Transaural Rendering for the Artificial Life Interactive Video Entertainment (ALIVE), Audio Engineering Society Convention 99, 10/1995.

Markus Guldenschuh discloses a camera for user tracking, however the author focuses on loudspeaker arrays, not microphone steering. Transaural Beamforming; Methods for Controllable Focused Sound Reproduction, Diploma Thesis, Institute of Electronic Music and Acoustics, University of Music and Performing Arts Graz, Graz, Austria, September 2009.

Christoph Boges, et al. disclose both acoustic and visual localization techniques to estimate location of a speaker, however this estimate is used only to steer a microphone array. Algorithms for Audiovisual Speaker Localisation in Reverberant Acoustic Environments, Proceedings of the 3$^{rd}$ Workshop on Positioning, Navigation and Communication (WPNC '06), March 2006.

Thus, although steering microphone arrays with estimates of speaker location is known, problem is still exist with the quality of audio signals obtained with such steered microphone arrays, as well as with non-steered microphones.

SUMMARY OF EMBODIMENTS

An embodiment of the present invention provides an audio system for use by a speaker. The system includes a microphone configured to detect speech uttered by the speaker. The microphone is configured to generate corresponding audio signals. The system also includes an audio signal processor, other than a beamformer. The audio signal processor is coupled to the microphone to receive the audio signals generated by the microphone. The audio signal processor is also configured to process the received audio signals.

A camera is oriented at least partially toward the microphone. The camera is configured to generate a scene image. An image analyzer is coupled to the camera. The image analyzer is configured to automatically analyze the scene image, so as to estimate a distance between the speaker and the microphone.

A tuner is coupled to the image analyzer and to the audio signal processor. The tuner is configured to automatically alter an operating parameter of the audio signal processor, based at least in part on the estimated distance between the speaker and the microphone.

Here and elsewhere, where a signal processor is described as being "other than a beamformer," there may also be a beamformer present. However, the recited signal processor is not a beamformer. That is, according to the embodiment, the tuner alters an operating parameter of an audio signal processor that is not a beamformer. Optionally, the tuner may also alter a parameter of a beamformer. However, altering a beamformer's parameter is not required, according to the embodiment.

Optionally, the operating parameter may include gain. The tuner may be configured to cause the gain to be set based on the estimated distance between the speaker and the microphone, such that a larger distance produces a larger gain.

The audio signal processor may include an anti-reverberation filter. The tuner may be configured to reduce aggressiveness of the anti-reverberation filter when the estimated distance is greater than a calculated value. When the estimated speaker-to-microphone distance is larger than about the critical reverberation distance, or the estimated direct-to-reverberated signal ratio is low, such as less than 1.0, some embodiments reduce aggressiveness of the filter, such as by decreasing an overestimation parameter for the reverberant energy estimate by about 3 dB.

The image analyzer may be configured to analyze the scene image, so as to estimate an orientation of the speaker, relative to the microphone. The tuner may be configured to alter the operating parameter of the audio signal processor, based at least in part on the estimated orientation of the speaker.

The operating parameter may include a plurality of gains, wherein each of the plurality of gains is associated with a range of frequencies. The tuner may be configured to cause at least one of the plurality of gains, associated with a high range of frequencies ("high-frequency gain"), to be set, relative to another at least one of the plurality of gains, associated with a low range of frequencies ("low-frequency gain"), based on the estimated orientation of the speaker. When the speaker is oriented away from the microphone, the high-frequency gain may be set higher, relative to the low-frequency gain, than when the speaker is oriented toward the microphone.

The image analyzer may be configured to detect a sound-reflecting surface disposed proximate the microphone and the speaker. The image analyzer may also be configured to analyze the scene image, so as to estimate a ratio of (a) sound energy reaching the microphone directly from the speaker and (b) sound energy indirectly reaching the microphone from the speaker after being reflected from the sound-reflecting surface. The tuner may be configured to alter the operating parameter of the audio signal processor, based at least in part on the estimated ratio.

The audio signal processor may include an anti-reverberation filter. The tuner may be configured to reduce aggressiveness of the anti-reverberation filter when the estimated ratio is less than a predetermined value. When the estimated speaker-to-microphone distance is larger than about the critical reverberation distance, or the estimated direct-to-reverberated signal ratio is low, such as less than 1.0, some embodiments reduce aggressiveness of the filter, such as by decreasing an overestimation parameter for the reverberant energy estimate by about 3 dB. When the estimated speaker-to-microphone distance is smaller than the critical reverberation distance, such as less than or equal to about half of the critical reverberation distance, or the estimated direct-to-reverberated signal ratio is high, such as greater than about 1.0, we prefer to increase aggressiveness of the filter, such as by increasing an overestimation parameter for the reverberation energy estimate by about 3 dB.

The image analyzer may be configured to detect a sound-reflecting surface disposed proximate the microphone and the speaker and analyze the scene image, so as to estimate (a) a reverberation time influenced by the sound-reflecting surface and/or (b) a reverberation distance influenced by the sound-reflecting surface. The tuner may be configured to alter the operating parameter of the audio signal processor, based at least in part on the estimated reverberation time and/or the estimated reverberation distance. When the estimated reverberation time is high, such as greater than about 200 mSec., aggressiveness of the filter may be reduced, such as by reducing an overestimation parameter for the reverberated energy estimation by about 3 dB.

The audio signal processor may include an anti-reverberation filter. The tuner may be configured to reduce aggressiveness of the anti-reverberation filter when the estimated reverberation time and/or the estimated reverberation is greater than a predetermined value.

The audio signal processor may be configured to generate a processed audio signal for amplification and thence for driving a loudspeaker. The image analyzer may be configured to detect a listener proximate the loudspeaker. The image analyzer may be further configured to analyze the scene image, so as to estimate a difference between arrival times at the detected listener of: (a) a direct acoustic signal from the speaker and (b) a corresponding indirect acoustic signal from the speaker, via the microphone, the audio signal processor and the loudspeaker. The tuner may be configured to alter the operating parameter of the audio signal processor, based at least in part on the estimated difference in arrival times.

The tuner may be configured to alter the operating parameter of the audio signal processor, so as to reduce volume of the loudspeaker, if the estimated difference in arrival times is greater than a predetermined value. If the time difference of arrival is greater than about 10 mSec., the amplitude of the loudspeaker may be reduced.

The tuner may be configured to alter the operating parameter of the audio signal processor, so as to reduce processing by the audio signal processor, if the estimated difference in arrival times is greater than a predetermined value. If the time difference of arrival is greater than about 10 mSec., the processing by the audio signal processor may be reduced.

The tuner may be configured to alter the operating parameter of the audio signal processor, so as to introduce a delay, if the estimated difference in arrival times is less than a predetermined value. If the time difference of arrival is less than about 10 mSec., a delay may be introduced, such as to make the difference of arrival about 10 mSec.

The image analyzer may be configured to estimate at least one attribute of a room, within which the microphone and the speaker are disposed. The image analyzer may be further configured to analyze the scene image, so as to estimate a reverberation time influenced by the at least one attribute. The tuner may be configured to alter the operating parameter of the audio signal processor, based at least in part on the estimated reverberation time.

The at least one attribute of the room may include an estimate of (a) size of the room and/or (b) amount of sound-absorbing material within the room.

The microphone may include a plurality of microphones. Each of the plurality of microphones may be associated with a respective potential speaker station. The image analyzer may be configured to ascertain absence of a respective speaker at each of the potential speaker stations. The tuner may be configured to cause the audio signal processor to ignore audio signals from each microphone that is associated with a potential speaker station having an absent speaker.

The image analyzer may be configured to detect mouth movement by a speaker and to estimate a distance between the speaker and the microphone, based at least in part on the detected mouth movement.

The image analyzer may be configured to detect a plurality of potential speakers and to detect mouth movement by at least one of the plurality of speakers. The tuner may be configured to cause the audio signal processor to preferentially process audio signals associated with the at least one of the plurality of speakers having detected mouth movement.

The audio signal processor may include an automatic speech recognizer configured to detect an utterance based at least in part on sound signal energy exceeding a threshold value. The tuner may be configured to adjust the threshold value, based on the estimated distance between the speaker and the microphone.

The image analyzer and the tuner may be configured such that the tuner alters the operating parameter of the audio signal processor before the audio signal processor receives the audio signals from the microphone.

Another embodiment of the present invention provides an audio system for use by a plurality of speakers. The system includes a microphone configured to detect speech uttered by at least one of the plurality of speakers and generate corresponding audio signals. An audio signal processor is coupled to the microphone to receive the audio signals generated by the microphone. The audio signal process is further configured to process the received audio signals.

A camera is oriented at least partially toward the microphone and configured to generate a scene image. An image analyzer is coupled to the camera and configured to automatically analyze the scene image, so as to detect a gesture by at least one of the speakers. A tuner is coupled to the image analyzer and to the audio signal processor and configured to automatically alter an operating parameter of the audio signal processor, so as to preferentially process audio signals corresponding to the at least one of the speakers who gestured.

Optionally, the at least one of the plurality of speakers may include at least two of the plurality of speakers.

Yet another embodiment of the present invention provides an audio system for use by a plurality of speakers. The system includes a microphone configured to detect speech uttered by the plurality of speakers and generate corresponding audio signals. An audio signal processor is coupled to the microphone to receive the audio signals generated by the microphone. The audio signal process is also configured to process the received audio signals.

A camera is oriented at least partially toward the microphone and configured to generate a scene image. An image analyzer is coupled to the camera. The image analyzer is configured to automatically analyze the scene image, so as to distinguish each of the plurality of speakers from other of the plurality of speakers and to detect when ones of the plurality of speakers utter speech. The image analyzer is also configured to automatically send information to the audio signal processor associating ones of the received audio signals with respective ones of the plurality of speakers who uttered the speech.

An embodiment of the present invention provides an audio system for use by a speaker. The system includes a microphone configured to detect speech uttered by the speaker and generate corresponding audio signals. An audio signal processor, other than a beamformer, is coupled to the microphone to receive the audio signals generated by the microphone. The audio signal processor is also configured to process the received audio signals.

A camera is oriented at least partially toward the microphone and configured to generate a scene image. An image analyzer is coupled to the camera and configured to automatically analyze the scene image, so as to estimate an orientation of the speaker, relative to the microphone. A tuner is coupled to the image analyzer and to the audio signal processor and configured to automatically alter an operating parameter of the audio signal processor, based at least in part on the estimated orientation of the speaker.

Another embodiment of the present invention provides a computer-implemented method for automatically processing speech uttered by a speaker into a microphone. The method includes detecting the speech uttered by the speaker and generating corresponding audio signals and processing the audio signals by an audio signal processor, other than a beamformer.

A scene image is generated with a camera, and the scene image is automatically analyzed, so as to estimate a distance between the speaker and the microphone. An operating' parameter of the audio signal processor is automatically altered, based at least in part on the estimated distance between the speaker and the microphone.

Optionally, the operating parameter includes gain, and the method includes causing the gain to be set based on the estimated distance between the speaker and the microphone, such that a larger distance produces a larger gain.

The audio signal processor may include an anti-reverberation filter, and the method may include reducing-aggressiveness of the anti-reverberation filter when the estimated distance is greater than a calculated value.

The method may also include analyzing the scene image, so as to estimate an orientation of the speaker, relative to the microphone and altering the operating parameter of the audio signal processor, based at least in part on the estimated orientation of the speaker.

The operating parameter may include a plurality of gains, wherein each of the plurality of gains is associated with a range of frequencies. The method may also include causing at least one of the plurality of gains, associated with a high range of frequencies ("high-frequency gain"), to be set, relative to another at least one of the plurality of gains, associated with a low range of frequencies ("low-frequency gain"), based on the estimated orientation of the speaker, such that when the speaker is oriented away from the microphone, the high-frequency gain is set higher, relative to the low-frequency gain, than when the speaker is oriented toward the microphone.

The method may also include detecting a sound-reflecting surface disposed proximate the microphone and the speaker and analyzing the scene image, so as to estimate a ratio of (a) sound energy reaching the microphone directly from the speaker and/or (b) sound energy indirectly reaching the microphone from the speaker after being reflected from the sound-reflecting surface. The operating parameter of the audio signal processor may be altered, based at least in part on the estimated ratio.

The audio signal processor may include an anti-reverberation filter. The method may also include reducing aggressiveness of the anti-reverberation filter when the estimated ratio is less than a predetermined value. Specific exemplary values are given above.

The method may also include detecting a sound-reflecting surface disposed proximate the microphone and the speaker and analyzing the scene image, so as to estimate: (a) a reverberation time influenced by the sound-reflecting surface and/or (b) a reverberation distance influenced by the sound-reflecting surface. The operating parameter of the audio signal processor may be altered, based at least in part on the at least one of the estimated reverberation time and the estimated reverberation distance.

The audio signal processor may include an anti-reverberation filter. The method may also include reducing aggressiveness of the anti-reverberation filter when the estimated reverberation time and/or the estimated reverberation distance is greater than a predetermined value.

The audio signal processor may be configured to generate a processed audio signal for amplification and thence for driving a loudspeaker. The method may further include detecting a listener proximate the loudspeaker. The method may further include analyzing the scene image, so as to estimate a difference between arrival times at the detected listener of (a) a direct acoustic signal from the speaker and (b) a corresponding indirect acoustic signal from the speaker, via the microphone, the audio signal processor and the loudspeaker. The operating parameter of the audio signal processor may be altered, based at least in part on the estimated difference in arrival times.

The method may also include altering the operating parameter of the audio signal processor, so as to reduce volume of the loudspeaker, if the estimated difference in arrival times is greater than a predetermined value. The method may also include altering the operating parameter of the audio signal processor, so as to reduce processing by the audio signal processor, if the estimated difference in arrival times is greater than a predetermined value. The method may also include altering the operating parameter of the audio signal processor, so as to introduce a delay, if the estimated difference in arrival times is less than a predetermined value.

The method may also include estimating at least one attribute of a room, within which the microphone and the speaker are disposed. The scene image scene may be analyzed, so as to estimate a reverberation time influenced by the at least one attribute. The operating parameter of the audio signal processor may be altered, based at least in part on the estimated reverberation time.

The at least one attribute of the room may include an estimate of size of the room and/or amount of sound-absorbing material within the room.

The microphone may include a plurality of microphones, each of the plurality of microphones being associated with a respective potential speaker station. The method may also include ascertaining absence of a respective speaker at each of the potential speaker stations and causing the audio signal processor to ignore audio signals from each microphone that is associated with a potential speaker station having an absent speaker.

The method may also include detecting mouth movement by a speaker and estimating a distance between the speaker and the microphone, based at least in part on the detected mouth movement.

The method may also include detecting a plurality of potential speakers and detecting mouth movement by at least one of the plurality of speakers. In addition, the audio signal processor may be caused to preferentially process audio signals associated with the at least one of the plurality of speakers having detected mouth movement.

The audio signal processor may include an automatic speech recognizer configured to detect an utterance based at least in part on sound signal energy exceeding a threshold value. The method may also include adjusting the threshold value, based on the estimated distance between the speaker and the microphone.

The method may also include altering the operating parameter of the audio signal processor before the audio signal processor receives the audio signals from the microphone.

Yet another embodiment of the present invention provides a computer-implemented method for automatically processing speech uttered by a plurality of speakers into a microphone. The method includes detecting speech uttered by at, least one of the plurality of speakers and generating corresponding audio signals. The audio signals are processed by an audio signal processor. A camera generates a scene image. The scene image is automatically analyzed, so as to detect a gesture by at least one of the speakers. An operating parameter of the audio signal processor is automatically altered, so as to preferentially, process audio signals corresponding to the at least one of the speakers who gestured.

The at least one of the plurality of speakers may include at least two of the plurality of speakers.

Another embodiment of the present invention provides a computer-implemented method for automatically processing speech uttered by a plurality of speakers into a microphone. The method includes detecting speech uttered by the plurality of speakers and generating corresponding audio signals. The audio signals are processed by an audio signal processor. A camera generates a scene image. The scene image is automatically analyzed, so as to distinguish each of the plurality of speakers from other of the plurality of speakers. The method includes automatically analyzing the scene image, so as to detect when ones of the plurality of speakers utter speech and sending information to the audio signal processor associating ones of the received audio signals with respective ones of the plurality of speakers who uttered the speech.

An embodiment of the present invention provides a computer-implemented method for automatically processing speech uttered by a speaker into a microphone. The method includes detecting speech uttered by the speaker and generating corresponding audio signals. The audio signals are processed by an audio signal processor, other than a beamformer. A camera generates a scene image. The scene image is analyzed, so as to estimate an orientation of the speaker, relative to the microphone. An operating parameter of the audio signal processor is altered, based at least in part on the estimated orientation of the speaker.

Another embodiment of the present invention provides a tangible non-transitory computer-readable storage medium with an executable program stored thereon for automatically processing speech uttered by a speaker into a microphone. The program is configured to detect the speech uttered by the speaker and generating corresponding audio signals and process the audio signals by an audio signal processor, other than a beamformer. The program is also configured to generate a scene image with a camera and analyze the scene image, so as to estimate a distance between the speaker and the microphone. The program is also configured to automatically alter an operating parameter of the audio signal processor, based at least in part on the est Mated distance between the speaker and the microphone.

Yet another embodiment of the present invention provides a tangible non-transitory computer-readable storage medium with an executable program stored thereon for automatically processing speech uttered by a plurality of speakers into a microphone. The program is configured to detect speech uttered by at least one of the plurality of speakers and generate corresponding audio signals and process the received audio signals by an audio signal processor. The program is also configured to generate a scene image with a camera and analyze the scene image, so as to detect a gesture by at least one of the speakers. The program is also configured to alter an operating parameter of the audio signal processor, so as to preferentially process audio signals corresponding to the at least one of the speakers who gestured.

An embodiment of the present invention provides a tangible non-transitory computer-readable storage medium with an executable program stored thereon for automatically processing speech uttered by a plurality of speakers into a microphone. The program is configured to detect speech uttered by the plurality of speakers and generating corresponding audio signals and process the audio signals by an audio signal processor. The program is also configured to generate a scene image with a camera and analyze the scene image, so as to distinguish each of the plurality of speakers from other of the plurality of speakers. The program is also configured to analyze the scene image, so as to detect when ones of the plurality of speakers utter speech and send information to the audio signal processor associating ones of the received audio signals with respective ones of the plurality of speakers who uttered the speech.

Another embodiment of the present invention provides a tangible non-transitory computer-readable storage medium with an executable program stored thereon for automatically processing speech uttered by a speaker into a microphone. The program is configured to detect speech uttered by the speaker and generating corresponding audio signals and process the audio signals by an audio signal processor, other than a beamformer. The program is also configured to generate a scene image with a camera and analyze the scene image, so as to estimate an orientation of the speaker, relative to the microphone. The program is also configured to alter an operating parameter of the audio signal processor, based at least in part on the estimated orientation of the speaker.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for using visual information to alter or set (collectively "alter") an operating parameter of an audio signal processor. A digital camera captures visual information about a scene that includes a human speaker and/or a listener. The visual information is analyzed to ascertain information about acoustics of an environment (room) surrounding the speaker and/or listener. For example, a distance between the speaker and a microphone may be estimated, and this distance estimate may be used to adjust an overall gain of the system.

Similarly, distances among, and locations of, the speaker, the listener, the microphone, a loudspeaker and/or a sound-reflecting surface may be estimated. These estimates may be used to estimate reverberations within the room and, for example, to adjust aggressiveness of an anti-reverberation filter, based on an estimated ratio of direct to indirect (reverberated) sound energy expected to reach the microphone. In addition, orientation of the speaker or the listener, relative to the microphone or the loudspeaker, as the case may be, can also be estimated, and this estimate may be used to adjust frequency-dependent filter weights (equalize) to compensate for uneven frequency propagation of acoustic signals from a mouth, or to a human ear, about a human head.

The visual information may be used to automatically identify locations of speakers, such as by automatically identify people in the scene and detecting mouth movements by the people or as a result of gestures by the people. Once the locations of the speakers have been identified, parameters of a spatial filter, such as a filter after a beamformer, may be altered to reject, ignore or remove sounds emanating from directions other than the locations of the speakers.

A space in which an audio system is used may generically be referred to as a "room." Thus, the passenger compartment of an automobile may be considered a room. Propagation of acoustic signals within a room may be modeled by an acoustic transfer function (RTF). For example, an acoustic channel between a speaker and a microphone may be modeled. Similarly, separate acoustic channels between the speaker and a listener and between a loudspeaker reinforcing the speaker's speech and the listener may be modeled. Embodiments of the present invention use visual information about the room to refine aspects of the RTF. These refinements may be implemented as adjustments to parameters of an audio signal processor.

Without visual information about a room or a priori knowledge about dimensions and materials of the room, it is difficult to estimate an acoustic channel. For example, without this information, it is difficult to differentiate between various possible reasons for loss of signal energy. One possible reason may be the distance between a speaker and a microphone, and another possible reason may be a lack of constructive interference from reverberations because the room is anechoic. A high signal level may also pose problems. For example, if a speaker is too close to a microphone, clipping may occur.

Furthermore, using only acoustic information to estimate an acoustic channel requires an acoustic signal. Therefore, the estimation can not begin until after a speaker begins speaking. Consequently, prior art systems that rely on acoustic signals to gather information about acoustic channels tend to cut off the beginnings of speaker utterances, thereby possibly loosing the first few words uttered, because optimized parameters are not available until after the speakers have begun to speak. In contrast, embodiments of the present invention can calculate these parameters before a speaker has begun to speak and, therefore, have improved or optimized the parameters by the time the speaker begins to speak.

Overview

Figure 1:
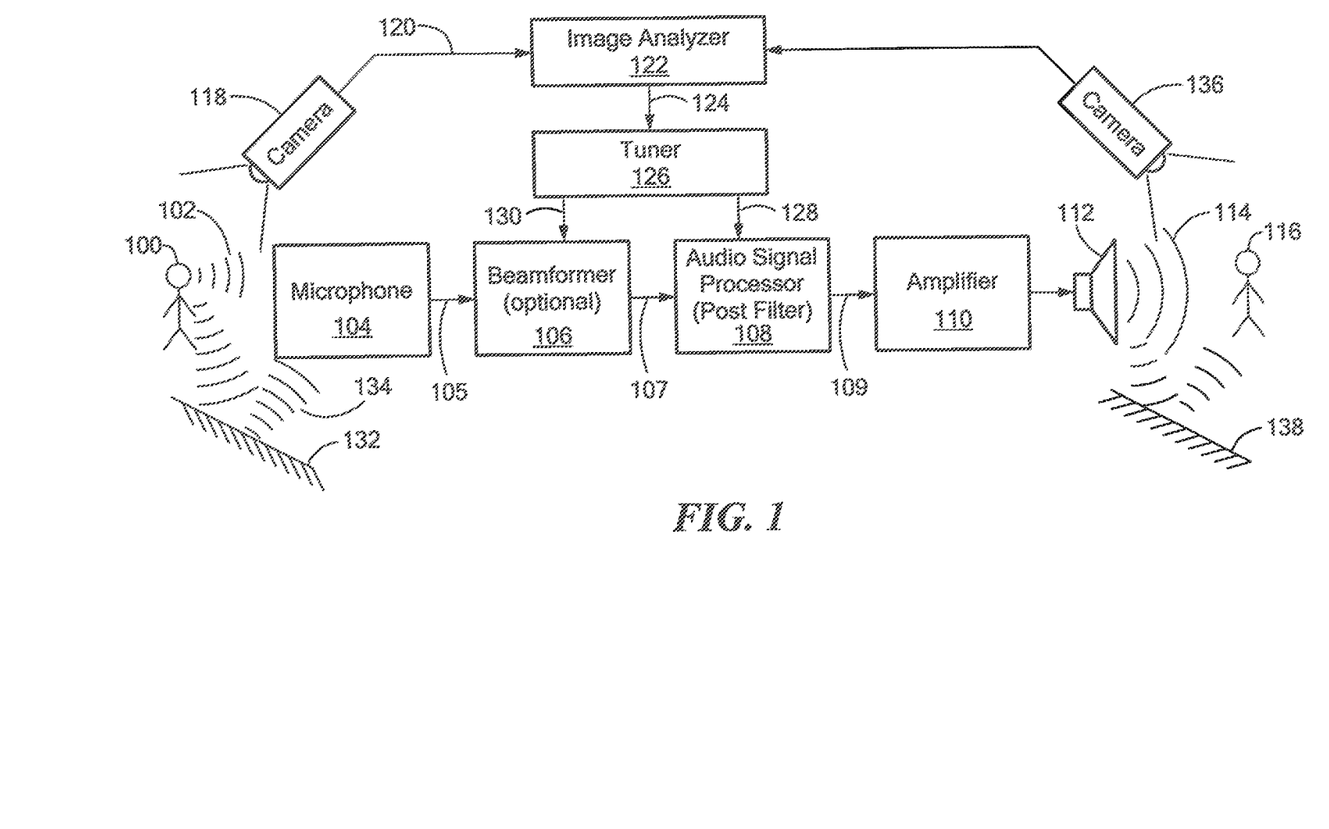
FIG. 1 is a schematic block diagram of an embodiment of the present invention showing its overall operation.

Drawbacks of the prior art are overcome by embodiments of the present invention, which use visual information about a room to fine-tune a model of an acoustic channel. FIG. 1 is a schematic block diagram of an embodiment of the present invention showing its overall operation. A speaker 100 speaks, and a resulting acoustic signal 102 is detected by a microphone 104. The microphone 104 may be a single microphone, a set of microphones, a set of diversity microphones or a microphone array. The microphone 104 generates an audio signal 105 that corresponds to the acoustic signal 102. If the microphone 104 is a microphone array, a beamformer 106 follows the microphone 104 in the signal path to produce a beamformed audio signal 107. Otherwise, the audio signal 107 is a non-beamformed audio signal.

An audio signal processor 108 follows the beamformer 106, if any. The audio signal processor 108 receives the audio signal 107 from the microphone 104 and is configured to process the audio signal 107. For example, the audio signal processor 108 may include a frequency-based filter bank (equalizer), an anti-reverberation filter, a spatial post-filter, a noise reduction filter or another type of filter; an automatic speech recognizer (ASR) or a combination thereof. The audio signal processor 108 is preferably implemented by a digital signal processor (DSP) executing instructions stored in a memory, however a general purpose processor (CPU) may be used. Optionally, a single DSP or CPU may implement both the beamformer 106 and the audio signal processor 108. However, logically, operations performed by the beamformer 106, such as adjusting phases or delays relative to signals from individual microphones of a microphone array so as to make the microphone array directionally sensitive, are distinct from other processing subsequently performed on the beamformed audio signal 107. Therefore, as used herein, the audio signal processor 108 is distinct from any beamformer 106 that may be included in a system. Both the beamformer 106 and a spatial post filter can exhibit spatial characteristics; however, their designs and operations are different, as would be appreciated by one of ordinary skill in the art.

In the embodiment shown in FIG. 1, an output 109 from the audio signal processor 108 is amplified by an amplifier 110, which drives a loudspeaker 112. The loudspeaker 114 generates a second acoustic signal 114, which may be heard by a listener 116. In other embodiments, the output 109 from the audio signal processor 108 may be provided to an automatic speech recognizer (ASR), game console or another system, as described in more detail below, and the amplifier 110, loudspeaker 112 and listener 116 may be absent. However, for the moment, some aspects of the present invention will be described in the context of the embodiment of FIG. 1.

A digital camera 118, such as a 2-D or 3-D camera, is aimed preferably generally toward the speaker 100 or so as to include a portion of the speaker 100 in the camera's field of view. Preferably, the camera's field of view includes the speaker's mouth or at least the speaker's head. The camera 118 generates a scene image signal 120.

An image analyzer 122 is coupled to the camera 118 to receive the scene image signal 120. The image analyzer 122 is configured to automatically analyze the scene image 120. From this visual information 120 about the room, the image analyzer 122 ascertains information about acoustics of the room, such as aspects of an RTF of the room. For example, the image analyzer 122 may estimate dimensions or volume of the room or detect presence, location and orientation of sound-reflecting or sound-absorbing surfaces in the room. The image analyzer 122 may also be configured to detect human speakers and listeners and microphones and loudspeakers in the room. The image analyzer 122 sends information about the room acoustics and other detected objects and/or information about how to compensate for aspects of the room's acoustics as an output signal 124.

Automatically Adjust Gain Based on Speaker Distance

In some embodiments, the image analyzer 122 is configured to automatically analyze the scene image so as to estimate a distance between the speaker 100 and the microphone 104, using well-known image analysis techniques. As noted, preferably at least a portion of the speaker 100 is in the camera's field of view. The camera's field of view may, but need not, also include the microphone 104. If the field of view does not include the microphone 104, the position and orientation of the camera 118, relative to the microphone 104, should be known. For example, the image analyzer 122 may be programmed with information about the distance of the microphone 104 to points along the edge of the scene captured by the camera 118, as well as the orientation of the camera 118 relative to the microphone 104. If a 2-D camera is used, conventional techniques, such as perspective shortening, may be used to estimate distances. If a 3-D camera is used, the camera provides depth information directly, although the camera may need to be calibrated before use.

Preferably, the camera 118 is stationary, i.e. fixed in position and orientation. However, optionally, the camera 118 may have an associated tilt, pan and/or zoom facility controlled by the image analyzer 122, so the image analyzer 122 can cause the camera 118 to capture different portions of the scene within the room and, thereby, capture an image of the speaker 100 and an image of the microphone 104, although not necessarily both at the same time. Using, information about how far the camera 118 was tilted, panned and/or zoomed between images, the image analyzer 122 can estimate the distance between the speaker 100 and the microphone 104.

A tuner 126 is coupled to the image analyzer 122 and to the audio signal processor 108. The tuner 126 is configured to automatically alter an operating parameter of the audio signal processor 108, based on an aspect of the RTF, as determined by the image analyzer 122. This parameter alteration is indicated schematically by arrow 128.

In some embodiments, the tuner 126 is configured to alter an operating parameter of the audio signal processor 108, based at least in part on the estimated distance between the speaker 100 and the microphone 104. Sound pressure level (SPL) of an acoustic signal, such as a speaker speaking, drops off with distance. For example, a doubling of distance causes a loss of 6 dB. The tuner 126 adjusts overall gain in the audio signal processor 108 to compensate for the loss in SPL, based on the estimated speaker-to-microphone distance provided by the image analyzer 122. That is, at greater estimated distances, the gains are larger.

Optionally, as the speaker-to-microphone distance changes, for example as the speaker 100 moves about the room or reorients her head, the image analyzer 122 and the tuner 126 update the operating parameter of the audio signal processor 108. This updating may occur periodically (such as ever second), occasionally (such as during otherwise idle or light load times of the DSP) or episodically (such as in response to the image analyzer 122 detecting a change in the speaker-to-microphone distance greater than a predetermined value or greater than a predetermined percentage). Likewise, other adjustments described herein may be made periodically, occasionally or episodically.

Automatically Adjust Frequency Weights Based on Speaker Orientation

Figure 2:
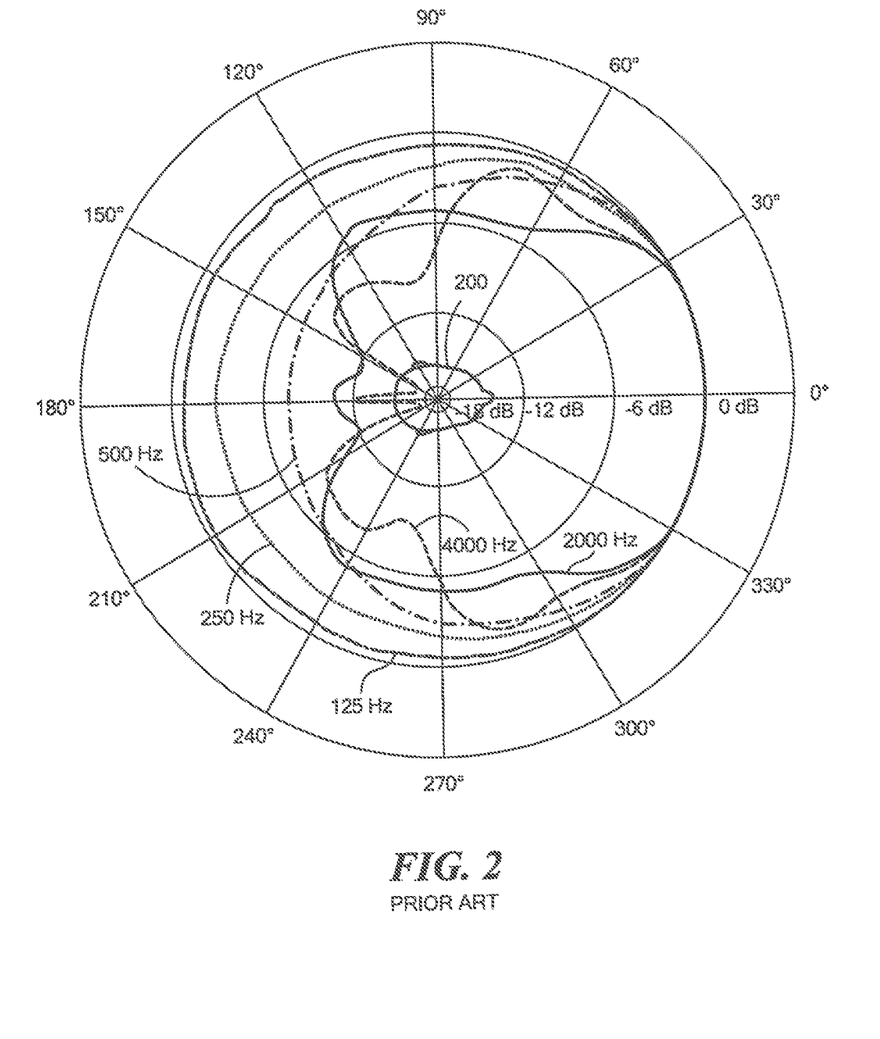
FIG. 2 is a prior art polar graph showing propagation of acoustic signals from a human mouth at various frequencies.

In addition to dropping off with distance, SPL of an acoustic signal from a speaker depends on frequency and angle. FIG. 2 is a polar graph showing propagation of acoustic signals from a human mouth at various frequencies. The graph includes an icon of a top view of a human head 200, with its mouth oriented toward 0 degrees. As the graph shows, low frequencies, such as 125 Hz and 250 Hz, radiate relatively equally in all directions, whereas high frequencies, such as 2,000 Hz and 4,000 Hz, radiate relatively directionally, primarily toward the front, with less energy propagating toward the sides, and even less energy propagating toward the rear. This uneven propagation of frequencies off the axis of a speaker's mouth explains why a rear passenger in an automobile has more difficulty understanding a speaker located in the front of the automobile than a front listener has understanding a speaker located in the rear of the automobile.

Returning, to FIG. 1, in some embodiments of the present invention, the image analyzer 122 is configured to automatically analyze the scene image 120, so as to estimate an orientation of the speaker 100, relative to the microphone 104. "Orientation" here means an angle between the microphone 104 and a direction of projection from the mouth of the speaker 100 (0 degrees in the graph of FIG. 2). The tuner 126 is configured to automatically alter the operating parameter of the audio signal processor 108, based at least in part on the estimated orientation of the speaker 100. In some embodiments, the audio signal processor 108 divides the audio spectrum it processes into frequency bands, and the audio signal processor 108 has a parameter that represents a gain (which may be expressed as a weight) for each frequency band. The tuner 126 is configured to set the gains, according to the orientation of the speaker 100 and an expected propagation pattern around the speaker's head, such as the pattern shown in FIG. 2. In other words, if the speaker 100 is oriented toward the microphone 104, the tuner 126 causes gains associated with high frequencies to be set approximately equal to gains associate with low frequencies. However, if the speaker 100 is oriented away from the microphone 104, the tuner 126 causes gains associated with high frequencies to be increased more than gains associated with low frequencies, and the increases depend on the angle of speaker's orientation.

Automatically Adjust Beamformer Based on Speaker Position

Returning again to FIG. 1; in some embodiments, the image analyzer 122 is configured to automatically ascertain position, i.e., location within the room, location within the scene or location relative to the microphone 104, of the speaker 100 from the scene image 120. The image analyzer provides this information 124 to the tuner 126, and the tuner 126 may automatically alter an operating parameter of the beamformer 106. For example, an operating parameter of the beamformer 106 may be altered so as to steer the beamformer 106 toward the speaker 100. Such alteration of a parameter of the beamformer 106 is indicated by arrow 130.

Automatically Identify Speaker(s) and Ignore Sounds from Other Directions

As noted, the visual information may be used to automatically identify locations of speakers and then reject, ignore or remove sounds emanating from directions other than the locations of the speakers. The image analyzer 120 may be configured to automatically identify potential speakers, i.e., people (as distinct from non-people) in the room, using well-known identification algorithms, such as identifying objects (faces) according to characteristic features, such as two eyes disposed within a generally round face. The image analyzer 120 may identify a person who is speaking by detecting mouth movements by the person and identify the location of the speaker. The audio signal processor 108 may provide spatial filtering, based on one or more parameters. After the image analyzer 120 identifies the location of the speaker, the tuner 126 may set the spatial parameters of the audio signal processor 108 (and optionally of the beamformer 106), based on the location of the speaker, to optimize or preferentially process audio signals emanating from the location of the speaker. Once the image analyzer ceases detecting the mouth movements, after a suitable delay, the tuner 126 may alter the parameter to now ignore sounds emanating from the location of the speaker.

Thus, the system may provide a visually-driven capability functionally equivalent to a "push-to-talk" (PTT) feature. However, the visually-driven system provides advantages over a convention PTT feature. A conventional PTT system obtains no information about which person is going to speak or where the person is located. Thus, conventional PTT systems can not alter parameters to preferentially receive acoustic signals from the speaker and ignore noise for other directions.

If multiple simultaneous speakers are allowed, this process may be performed in parallel for each detected speaker. However, in some situations, only one person should speak at a time, or at least speech from only one person at a time should be processed. In such a case, the first detected speaker may be handled as described above, and subsequent speakers may be ignored until the first speaker ceases speaking. Optionally or alternatively, a gesture, such as raising or waving a hand, may be defined as a mechanism to select a speaker. In this case, the image analyzer 120 is configured to detect the gesture, identify the person who made the gesture as the speaker and identify the location of the speaker.

Optionally, the image analyzer 120 may deem the person a speaker as long as the person continues gesturing. Alternatively, once the image analyzer 120 identifies a person as having made the gesture and is deemed a speaker, the image analyzer 120 may continue deeming the person a speaker for a predetermined amount of time, until the speaker makes a different gesture, until some other person makes the first gesture or until some other stopping criteria has been satisfied. Thus, a gesture can be used by a person or a set of people to "enroll" as a speaker or as a set of speakers. In some embodiments, an (optionally quiet) enrollment phase precedes any audio processing. In other words, during the enrollment phase, only gestures are recognized to identify the speakers. Once the enrollment phase ends, the system process speech signals from the enrolled speakers. Some, embodiments, such as those used with two-player video games, may enforce a maximum number of simultaneous speakers.

Automatically Adjust Parameters Based on Estimated Reverberation

A room may include one or more sound-reflecting surfaces, exemplified by sound-reflecting surface 132. The sound-reflecting surface 132 may be, for example, a wall, floor or ceiling that partially defines the room. The surface 132 may also be a structural member, such as a column, within the room or part of another object, such as a desk, placed within the room. A portion of the acoustic signal from the speaker 100 may reflect ("reverberate") from the surface 132, and a portion of the reverberated signal 134 may be detected by the microphone 104. The reverberated signal 134 takes a longer path (a "reverberation path") to the microphone 104 than the direct acoustic signal 102. Therefore, the reverberated signal 134 arrives at the microphone 104 later than the direct signal 102. The total length of the path taken by the reverberated signal 134, i.e., from the speaker 100 to the sound-reflecting surface 132, and from the sound-reflecting surface 132 to the microphone 104, is referred to herein as the "reverberation distance."

In some embodiments, the image analyzer 122 is configured to automatically detect a sound-reflecting surface, such as surface 132, disposed proximate the speaker 100 and the microphone 104. The image analyzer 122 is also configured to analyze the scene image, so as to automatically estimate a ratio of (a) sound energy reaching the microphone 104 directly from the speaker 100 to (b) sound energy indirectly reaching the microphone 104 from the speaker 100 after being reflected from the sound-reflecting surface 132. The tuner 126 is configured to automatically alter an operating parameter of the audio signal processor 108, based at least in part on the estimated ratio. For example, if the audio signal processor 108 includes an anti-reverberation filter, the tuner 126 may be configured to reduce aggressiveness of the anti-reverberation filter when the estimated ratio is less than a predetermined value.

"Reverberation time" is an amount of time required for reflections of a sound in a room to decay to below a specified amount, such as to below human perception. For example, Reverberation Time 60 (RT60) is the time required for reflections of a sound to decay by 60 dB below the level of the direct sound that caused the reverberation. Reverberation time is often stated as a single value. However, reverberation time can be measured as a wide band signal, such as 20 Hz to 20 kHz, or more precisely in narrow frequency bands, such as one octave, 1/3 octave, 1/6 octave, etc. Typically, for a given room, the reverberation time of one narrow frequency band is different than the reverberation time of a different narrow frequency band.

Reverberation time is proportional to the dimensions of a room and inversely proportional to the amount of absorption present. Rooms used for speech typically need a relatively short reverberation time for the speech to be understood clearly. Otherwise, if the reflected sound from one syllable or phoneme is still heard when the next syllable or phoneme is uttered, it may be difficult to understand what was said. For example, "cat," "cab" and "cap" may all sound very similar. If, on the other hand, the reverberation time is too short, tonal balance and loudness may suffer.

When dealing with a directional sound source, "critical reverberation distance" (or simply "critical distance") is a distance at which sound pressure level (SPL) of a direct sound and its corresponding reverberant sound fields are equal. In other words, at a point in space that is the critical reverberation distance from a sound source, the amplitude of a reflected sound is the same as that of the direct sound. Critical reverberation distance depends on geometry and absorption of the space, in which the sound waves propagate, as well as dimensions and shape of the sound source.

A highly reverberant room has a short critical reverberation distance, whereas an acoustically dead (anechoic) room has a longer critical reverberation distance. Critical reverberation distance can be specified as a function of room volume and reverberation time using Sabine's approximation.

As noted, SPL of a direct sound falls off with distance. However, SPL of a reverberant sound at a microphone is largely independent of the distance between the source of the sound and the microphone. When characterizing an acoustic channel, another useful concept is a ratio of SPL of a direct sound to SPL of a reverberation of the sound, as measured at the microphone.

A room may include many sound-reflecting surfaces, and each of these surfaces may contribute a reverberated signal. Collectively, these reverberated signals can make speech signals detected by a microphone difficult to understand, especially in large halls with hard walls and little sound absorbing material. Some prior art audio systems include anti-reverberation filters ("post filters") to reduce the impact of such reverberated signals. However, prior art anti-reverberation filters are designed with an assumption that the speaker-to-microphone distance is equal to the critical reverberation distance. Thus, if the speaker is further from, or closer to, the microphone than the critical reverberation distance, these filters fail to operate as desired.

Most post filters are based on dynamic spectral weighs. When a post filter detects direct sound, it essentially allows a signal to pass through the filter. On the other hand, when no direct sound is detected, the post filter suppresses frequencies associated with reverberations, so the reverberations and noise are suppressed. Most post filter algorithms include estimating two energies: (a) a total signal energy, i.e., energy of a direct signal plus energy of reverberated signals and (b) energy of the reverberated signals, i.e., components that do not come from the desired direction ("off-axis" signals).

We have found that when off-axis components dominate the total signal, post filters become too aggressive. When the direct-to-reverberated signal ratio is low, conventional post filters aggressively filter the total signal. However, the amount of direct signal energy in the total signal is very low. Thus, the aggressive filtering passes very little or none of the direct signal. When the estimated speaker-to-microphone distance is large, such as larger than about the critical reverberation distance, or the estimated direct-to-reverberated signal ratio is low, such as less than 1.0, we prefer to reduce aggressiveness of the filter, such as by decreasing an overestimation parameter for the reverberant energy estimate by about 3 dB. Essentially, we reduce the impact of the off-axis components. In some embodiments, we make the post filter open more often and stay open longer.

Similarly, we have found that when the estimated speaker-to-microphone distance is smaller than the critical reverberation distance, such as less than or equal to about half of the critical reverberation distance, or the estimated direct-to-reverberated signal ratio is high, such as greater than about 1.0, we prefer to increase aggressiveness of the filter, such as by increasing an overestimation parameter for the reverberation energy estimate by about 3 dB.

The image analyzer 122 may be configured to automatically estimate the ratio of direct-to-reverberated signal strength by estimating the distance from the speaker 100 to the microphone 104 (as discussed above) and estimating number and lengths of paths ("reverberation paths") of reverberated signals. Using the reverberated signal 134 as an example, the image analyzer 122 estimates a distance between the speaker 100 and the sound-reflecting surface 132, and a distance between the sound-reflecting surface 132 and the microphone 104 (the total being the reverberation distance). The image analyzer 122 automatically estimates sound reflectance of the surface 132, such as based on an analysis of the texture and/or composition of the surface 132. Well-known techniques may be used to automatically identify objects, such as floor carpeting, cloth curtains, sound absorbing panels, table cloths and the like. The image analyzer 122 then estimates strength of the reverberated signal 134, as a fraction of the strength of the direct signal 102, based the sound reflectance of the surface 132 and on the expected drop-off in SPL with distance.

The image analyzer 122 performs similar calculations for other sound-reflecting surfaces (not shown). It should be noted that a large detected surface may be treated by the image analyzer 122 as several independent sound-reflecting surfaces, and the above-described estimate may be generated for each such independent surface. Furthermore, although the reverberated path shown in FIG. 1 includes only one reflection, other reverberated paths (not shown) may include more than one reflection from the same or different sound-reflecting surfaces, and their reverberation distances are the totals of the lengths of each path segment.

We have found that adjustments to the aggressiveness of an anti-reverberation filter may optionally or alternatively be based on estimates of the reverberation time. When the reverberation time is high, post filters become too aggressive. When the estimated reverberation time is high, such as greater than about 200 mSec., we prefer to reduce aggressiveness of the filter, such as by reducing an overestimation parameter for the reverberated energy estimation by about 3 dB.

As noted, the image analyzer 122 may be configured to automatically detect a sound-reflecting surface, such as surface 132, disposed proximate the speaker 100 and the microphone 104. The image analyzer 122 may be configured to automatically analyze the scene image 129, so as to estimate a reverberation time influenced by the sound-reflecting surface 132 and/or a reverberation distance influenced by the sound-reflecting surface 132. The tuner may be configured to automatically alter an operating parameter of the audio signal processor, based at least in part on the estimated reverberation time or the estimated reverberation distance. If the audio signal processor 108 includes an anti-reverberation filter, the tuner 126 may be configured to reduce aggressiveness of the anti-reverberation filter when the estimated reverberation time or the estimated reverberation distance is greater than a predetermined value.

As noted, prior art anti-reverberation filters are designed with an assumption that the speaker is located the critical reverberation distance away from the microphone. Thus, prior art anti-reverberation filters fail to operate as desired if the speaker is further from, or closer to, the microphone than the critical reverberation distance. Embodiments of the present invention extend the range of distances, over anti-reverberation filters may be used with good results.

Beamformer algorithms may also operate suboptimally outside the critical reverberation distance. In some embodiments of the present invention, the tuner 126 automatically adjusts 130 parameters of the beamformer 106, based on estimates of: speaker-to-microphone distance, ratio of direct-to-reverberated sound energy reaching the microphone, reverberation distance and/or reverberation time, in manners similar to those discussed above.

Automatically Adjust Parameters Based on Estimated Listener Distance, etc.

Thus far, we have described automatically adjusting parameters of the audio signal processor 108, based on information obtained by the camera 118 about the distance, position and/or orientation of the speaker 100 and/or the position of a sound-reflecting surface 132. In similar manners, parameters may be automatically adjusted based on information obtained by the same camera 118 or by another camera 136 about the listener 116 and/or a sound-reflecting surface 136 proximate the loudspeaker 112 and the listener 116.

In one embodiment, the image analyzer 122 automatically detects orientation of the head of the listener 116, relative to the loudspeaker 112. Based on this information, the tuner 126 automatically adjusts one or more parameters of the audio signal processor 108, so as to equalize the frequency response the listener 116 perceives from the loudspeaker 112. A pattern, similar to the pattern shown in FIG. 2, may be used to inform the amounts by which each frequency band weight is adjusted, based on the orientation of the listener 116. Similarly, the tuner 126 may automatically adjust the volume of the loudspeaker 112, based on the distance between the loudspeaker 112 and the listener 116.

If the listener 116 is within hearing distance of the speaker 100, for example, if the speaker is in a front seat of a vehicle and the listener 116 is in a rear seat of the same vehicle, the listener 116 may hear the speaker 100 directly, although the amplitude of the direct acoustic signal may be insufficient to easily understand the speaker's speech. As noted, some vehicles include intercom systems to overcome this problem. However, signal processing by the audio signal processor 108 and the beamformer 106 (if present) of such an intercom system take time, thereby delaying the audio signal. Consequently, direct sounds from the speaker 100 typically arrive at the listener 116 before corresponding sounds from the loudspeaker 112.

The delayed sounds from the loudspeaker 112 may interfere with understanding of the speaker's speech. The delays may create a reverberatory effect or confuse the listener 116. For example, if the loudspeaker 112 is not located along a line of sight between the listener 116 and the speaker 100, large delays may cause the listener 116 to perceive the sound as coming from the loudspeaker 112, instead of from the speaker 100. In many automobile intercom systems, loudspeakers are located behind rear seat headrests, which can exasperate the problem.

It is known that a time difference of arrival of up to about 10 mSec. is acceptable, but that if the time difference of arrival is greater than about 10 mSec., the amplitude of the loudspeaker should be reduced. However, the prior art provides no guidance on how to ascertain the time difference of arrival in real-world situations, such as in a vehicle, or how to automatically or dynamically adjust amplitude of the signals from the loudspeaker in response to the time difference of arrival.

We have discovered that a digital camera, located in a vehicle or other room with an intercom or public address system, may be used to automatically estimate time difference of arrivals of acoustic signals and automatically adjust an operating parameter of an audio signal processor, based on the estimated difference. This adjustment may be performed repeatedly, such as to accommodate for movement of the speaker and/or listener's heads or for re-orientations of the heads. For example, if the estimated time difference of arrival is greater than a predetermined threshold, such as about 10 mSec., the tuner 126 may cause the audio signal processor 108 to reduce (potentially to zero) the amplitude of the audio signal. Conversely, if the estimated time difference of arrival is less than a predetermined threshold, such as about 10 mSec., the tuner 126 may cause the digital signal processor 108 to introduce a delay in the audio signal, so the time difference of arrival becomes a target value, such as about 10 mSec. Such a delay may improve sound quality, as perceived by the listener because, for example, some delay creates desirable "depth" to the sound.

Figure 3:
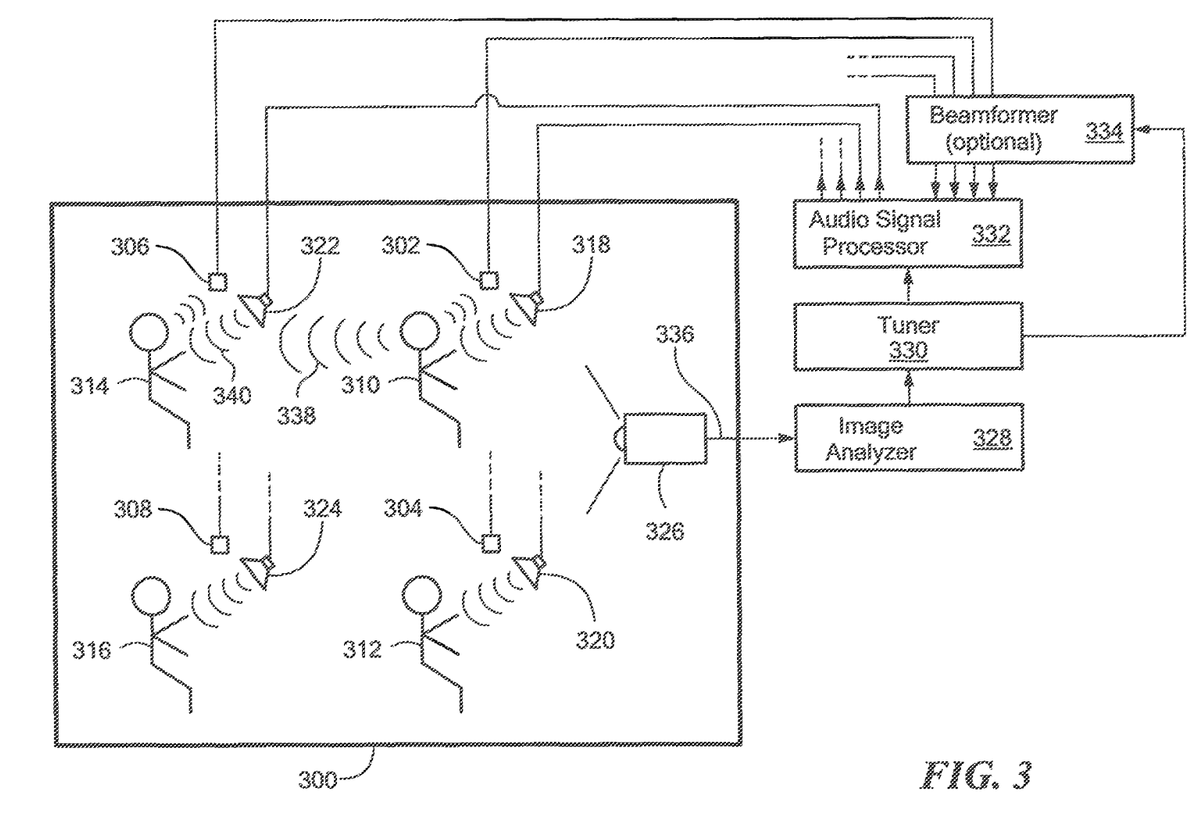
FIG. 3 is a schematic diagram of an automobile with an embodiment of the present invention deployed therein.

FIG. 3 is a schematic diagram of an automobile 300 with an embodiment of the present invention deployed therein. For simplicity, the automobile 300 is assumed to have two rows of seats (a front row and a back row) and two seats (or locations where an occupant may sit, such on a bench seat) in each row. However, embodiments of the present invention may be used in vehicles with other numbers of rows of seats and other numbers of seats per row.

In the embodiment shown in FIG. 3, microphones 302, 304, 306 and 308 are disposed within the vehicle 300, one microphone for each potential occupant 310, 312, 314 and 316. Each microphone 302-308 may be a distinct one or more microphones, a set of diversity microphones or a microphone array. Optionally or alternatively, one or more single microphones, sets of diversity microphones or microphone arrays may serve two or more of the occupants 310-316. Similarly, one or more loudspeakers 318, 320, 322 and 324 are disposed within the vehicle 300. Each loudspeaker 318-324 may serve a single occupant, or one loudspeaker may serve more than one occupant 310-316. In other embodiments, microphones may be provided only for front row seats, and loudspeakers may be provided for only rear row seats, or any other suitable combination or configuration, depending on, for example, expected or desired: number of occupants, rows or seats per row; noise level; system cost; and system performance level.

One microphone may be sufficient per row, except in particularly noisy environments, such as convertible vehicles, in which side-to-side intercom use may be desired. However, a microphone and a loudspeaker for each seat is preferable, particularly in vehicles with more than two rows of seats. FIG. 3 shows one camera 326; however, more cameras may be used, depending on the considerations described above, configuration of the vehicle 300, position and orientation of the camera 326, view angle of the camera 326, etc.

The embodiment shown in FIG. 3 also includes an image analyzer 328, a tuner 330 and an audio signal processor 332, similar to corresponding items described above with respect to FIG. 1. An amplifier is assumed to be included in the audio signal processor 332 or separate from the signal processor 332 (not shown). Optionally, a beamformer 334 may be included.

In some embodiments, the image analyzer 328 uses the scene image signal 336 to automatically identify occupied seat positions, and the tuner 330 automatically adjusts parameters of the audio signal processor 332 to effectively turn off microphones 302-308 and/or loudspeakers 318-324 associated with unoccupied positions. For example, weights for these microphones may be set to zero or to some other suitably low value. If a microphone array is used to serve several potential seat positions, the tuner 330 may set parameters of the beamformer 334 so as to reject or ignore acoustic signals from the unoccupied seat positions. In some embodiments, the image analyzer uses the scene image signal 336 to automatically detect mouth movements of occupants and to effectively turn off microphones 302-308 associated with occupants who are not moving their mouths, i.e., not speaking.

As noted, differences in arrival times of corresponding sounds greater than about 10 mSec. pose problems. For example, if the difference in arrival times at back seat occupant/listener 314 of a direct sound 338 from front seat occupant/speaker 310 and a corresponding sound from loudspeaker 322 (an "indirect sound") is no greater than about 10 mSec., the listener 314 is likely to correctly judge the location of the speaker 310. However, if the difference in arrival times is greater than about 10 mSec., the listener 314 is likely to misjudge the location of the speaker 310.

In some embodiments, the image analyzer 328 uses the scene image signal 336 from the camera 326 to automatically estimate the time difference of arrival of these two acoustic signals. The image analyzer 328 estimates three distances: (a) between the speaker 310 and the listener 314, i.e., the direct acoustic path; (b) between the speaker 310 and the speaker's microphone 302; and (c) between the listener's loudspeaker 322 and the listener 314. The image analyzer 332 estimates the time difference of arrival of the two acoustic signals, taking into account the three estimated distances and an estimate of the amount of time the audio signal processor 332 (and optionally the beamformer 334) take to process audio signals.

The image analyzer 328 automatically estimates the SPL (or volume or another suitable measure) of the direct acoustic signal 338, as will be heard by the listener 314, based on the length of the direct acoustic path 338. The image analyzer 328 also automatically estimates the SPL (or volume or another suitable measure) of the acoustic signal 340 the listener 314 will hear from the loudspeaker 322, based on the distance between the speaker 310 and the microphone 318, current parameters (such as amplification) of the audio signal processor 332 and the distance between the loudspeaker 322 and the listener 314.

If the estimated time difference of arrival is no greater than about 10 mSec., the tuner 330 automatically adjusts (if necessary) an operating parameter of the audio signal processor 332, such that the ratio of the SPL (at the listener 314) of the acoustic signal from the loudspeaker 322 to the SPL (at the listener 314) of the direct acoustic signal 338 is about 1:1 or, optionally, a little greater than 1:1. However, if the estimated time difference of arrival is greater than 10 mSec., the tuner 330 adjusts the operating parameter of the audio signal processor 332, such that the ratio is less than 1:1 (as low as 0:1). The parameter may be adjusted, such that the ratio is less than 1:1 by an amount dependant upon the amount by which the time difference of arrival exceeds 10 mSec. This adjustment effectively reduce the volume of the loudspeaker 322, if the estimated difference in arrival times is greater than a predetermined value. Conversely, optionally, if the estimated time difference of arrival is less than 10 mSec., the tuner 330 may adjust the operating parameter of the audio signal processor 332, such that the ratio is greater than 1:1.

Optionally or alternatively, if the estimated difference in arrival times is greater than a predetermined value, such as about 10 mSec., tuner 330 may be configured to automatically alter the operating parameter of the audio signal processor 332 (and optionally the beamformer 334), so as to reduce the amount of processing performed (optionally, down to zero), thereby reducing the amount of time required for the signal processing (therefore, the latency of the audio signal processor) and reducing the difference in the arrival times of the direct and indirect signals.

In general, DSP algorithms and hardware for the audio signal processor 332 and the beamformer 334 should be chosen so processing introduces no more than a 10 mSec. delay. However, this may not be possible or practical, given real-world constraints, such as budgets on cost, size, power consumption and heat dissipation. Thus, dynamically automatically altering a parameter, so as to alter a processing algorithm of the audio signal processor 332 and/or beamformer 334 (such as by reducing complexity or sophistication of the algorithm or foregoing steps and/or processes) can reduce processing time, so as to keep the difference in arrival times to no more than about 10 mSec. or another suitable time.

Optionally, the tuner 330 may use information about the SPL of the speaker's speech, as detected by the microphone 302, to automatically adjust the parameter of the audio signal processor 332. For example, if the speaker 310 speaks softer than an average speaker, the direct acoustic signal 338 may be so low in volume at the listener 314 as to be practically inaudible. In such a case, the time difference of arrival of the direct and indirect signals may be of no consequence, and the ratio of the SPL of the acoustic signal from the loudspeaker 322 to the SPL of the direct acoustic signal 338 may be made higher, and possibly much higher, than 1:1, even if the difference in arrival times is greater than 10 mSec. In addition, the parameter may be automatically adjusted such that a desired volume is achieved at the listener 314.

Automobile intercom and ASR systems are typically highly tuned for acoustics of the respective automobiles, microphone and loudspeaker placement, loudspeaker volume, average occupant positions, volumes of speakers, etc. Camera-based systems, as disclosed herein, automatically adjust for situations where a speaker and/or a listener is not in an average position or the speaker does not speak with average volume.

Furthermore, in in-car communication (ICC) systems, signals played back over loudspeakers superposes with direct sounds from the speaker at the listener's ears. The listener can perceive a difference in the levels of these two sound components, as well as a difference in the times of arrival (delays) of these two sound components. Sound level and relative time delay are of similar importance to the listener, such as for judging the location of the speaker. Controlling the sound level, based on visual information (as discussed herein), is more practical than controlling the delay.

Reverberations in a vehicle may cause a comb filter effect to appear in the room transfer function (RTF), with notches in the response at multiples of certain frequencies. To compensate for this effect, some embodiments automatically modify estimates of the RTF, based on visual information about the vehicle. For example, if the image analyzer 328 detects that a speaker is speaking toward a highly sound-reflecting surface, such as a hard glass window, the tuner 330 may modify the estimated RTF accordingly.

Home Entertainment Applications

Figure 4:
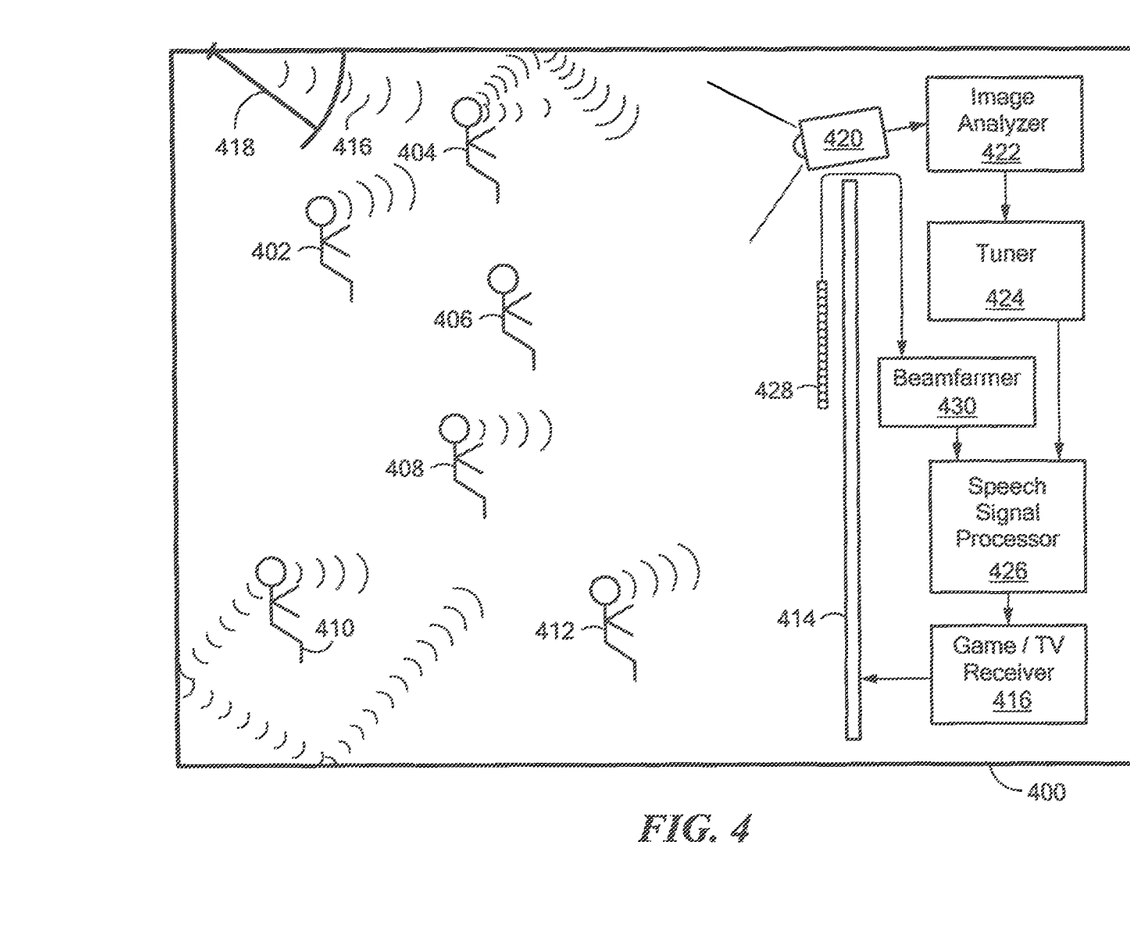
FIG. 4 is a schematic diagram of a home entertainment room and associated equipment with an embodiment of the present invention deployed therein.

FIG. 4 is a schematic diagram of a home entertainment room 400 and associated equipment with an embodiment of the present invention deployed therein. Several users 402, 404, 406, 408, 410 and 412 are shown watching a voice-controlled television/game display 414 driven by a television receiver or game 416. Although many or all of the users 402-412 are speaking, hypothetically only two of the users, i.e., users 402 and 408, may be players of the game. Thus, sounds emanating from the other users 404, 406, 410 and 412 is noise. Furthermore, noise 416 from an external source may be entering the room 400 via a door 418.

A camera 420 is coupled to an image analyzer 422, which drives a tuner 424 coupled to a speech signal processor 426. A microphone or microphone array 428 is coupled to a beamformer 430.

In one embodiment, during an enrollment phase, the two players 402 and 408 enroll with the image analyzer 422, as described above. Thereafter, the image analyzer 422 and the tuner 424 co-operate to preferentially process acoustic signals from the enrolled players 402 and 408, and ignore noise from the other users 404, 406, 410 and 412 and the external noise 416. Optionally or alternatively, the image analyzer 422 and/or the tuner 424 may configure a beamformer in the speech signal processor 426 so as to aim the microphone or microphone array 428 at the enrolled players 402 and 408.

Optionally, if the game 416 accepts speech or text as input from each of the players, the identity of each player 402 or 408 (perhaps simply as "Player 1" and "Player 2") may be passed to the game 416, along with corresponding speech signals or recognized speech (if the speech signal processor 426 includes an ASR), because the image analyzer 422 has identified the locations of the two players 402 and 408, and the speech signal processor 426 uses this location information to distinguish and label audio signals emanating from these two locations.

In another embodiment, only one user at a time is recognized by the image analyzer 422, such as to change channels and adjust volume of the television 414. In such an embodiment, a speaker may gesture, such as by raising a hand, to indicate to the image analyzer 422 that the speaker wishes to be heard by the system. In response, the image analyzer 422 and the tuner 424 co-operate to preferentially process acoustic signals from the speaker who raised her hand. Optionally or alternatively, the image analyzer 422 and/or the tuner 424 may configure a beamformer in the speech signal processor 426 so as to aim the microphone or microphone array 428 at the speaker who gestured. After a predetermined period of silence or another gesture by the speaker or a gesture by another speaker or another suitable stopping criterion, the image analyzer 422 and the tuner 424 cease preferentially processing acoustic signals from the speaker.

Speaker identification may be done by visual processing of a picture, as described above, or by analyzing an audio signal. If the image analyzer 422 and/or tuner 424 has information about which speaker is speaking, the tuner 424 may use speaker-specific parameters, such as for compensating for speaker-specific effects, such as the Lombard effect, or to adjust the speech dialogue for the speaker's preferences. The Lombard effect or Lombard reflex is an involuntary tendency of speakers to increase their vocal effort when speaking in the presence of loud noise to enhance the audibility of their voices, essentially increasing the signal-to-noise ratio of their spoken words. This change includes loudness and other acoustic features, such as pitch and rate and duration of sound syllables.

Other Applications

In situations that involve multiple speakers and/or multiple listeners, the adjustments described herein may be made on a per-speaker and/or per-listener basis. That is, different parameters may be automatically adjusted differently for each speaker and/or listener based, for example, on each speaker-to-microphone distance.

Speech detectors, such as speech detectors in automatic speech recognizers (ASRs), typically are triggered by detecting onset of speech energy that exceeds a predetermined threshold (signal activity). However, speaker-to-microphone distance can impact this detection. As noted, the amount of speech energy detected by a microphone depends on the speaker-to-microphone distance. Thus, if the speaker-to-microphone distance is relatively large, the threshold should be comparably reduced to be triggered by the same speaker volume, as measured at the speaker's mouth. Otherwise, the speaker would have to speak louder at greater microphone distances. Conventional ASRs do not, however, have access to this distance information. Consequently, conventional ASRs can not adjust their energy thresholds based on this distance.

Some embodiments of the present invention automatically provide a speaker-to-microphone distance (or equivalently a threshold value that has been corrected according to the microphone distance) to an ASR.

Methods and apparatus are disclosed for using visual information to alter or set an operating parameter of an audio signal processor. Such as system or method may be implemented by a processor controlled by instructions stored in a memory. The memory may be random access memory (RAM), read-only memory (ROM), flash memory or any other memory, or combination thereof, suitable for storing control software or other instructions and data. Some of the functions performed by the system or method have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable tangible storage media (e.g. read-only memory devices within a computer, such as ROM, or devices readable by a computer I/O attachment, such as CD-ROM or DVD disks), information alterably stored on tangible writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the system and methods have been described with reference to a flowchart, those skilled in the art should readily appreciate that functions, operations, decisions, etc. of all or a portion of each block, or a combination of blocks, of the flowchart may be combined, separated into separate operations or performed in other orders. Furthermore, disclosed aspects, or portions of these aspects, may be combined in ways not listed above. Accordingly, the invention should not be viewed as being limited to the disclosed embodiments.

What is claimed is:

1. A method, comprising:
providing a microphone to detect speech uttered by a speaker and generate audio signals from the speech received by the microphone;
coupling an audio signal processor to the microphone to receive the audio signals and process the received audio signals;
providing a camera that can be at least partially orientated toward the microphone to generate a scene image;
coupling an image analyzer to the camera to automatically analyze the scene image for estimating a distance between the speaker and the microphone;
coupling a tuner to the image analyzer and to the audio signal processor to automatically alter an operating parameter of the audio signal processor, based at least in part on the estimated distance between the speaker and the microphone;
detecting a sound-reflecting surface disposed proximate the microphone and the speaker by analyzing the scene image, so as to estimate a ratio of:
sound energy reaching the microphone directly from the speaker and
sound energy indirectly reaching the microphone from the speaker after being reflected from the sound-reflecting surface; and
altering the operating parameter of the audio signal processor, based at least in part on the estimated ratio,
wherein the audio signal processor comprises an anti-reverberation filter and the tuner to reduce aggressiveness of the anti-reverberation filter when the estimated ratio is less than a predetermined value.

2. The method according to claim 1, wherein the operating parameter comprises gain and the tuner to cause the gain to be set based on the estimated distance between the speaker and the microphone, such that a larger distance produces a larger gain.

3. The method according to claim 1, wherein the audio signal processor comprises an anti-reverberation filter and the tuner to reduce aggressiveness of the anti-reverberation filter when the estimated distance is greater than a calculated value.

4. The method according to claim 1, further including:
detecting the sound-reflecting surface disposed proximate the microphone and the speaker and analyzing the scene image, so as to estimate at least one of: a reverberation time influenced by the sound-reflecting surface and a reverberation distance influenced by the sound-reflecting surface; and
altering the operating parameter of the audio signal processor, based at least in part on the at least one of the estimated reverberation time and the estimated reverberation distance.

5. The method according to claim 1, further including:
generating a processed audio signal for amplification and thence for driving a loudspeaker;
detecting a listener proximate the loudspeaker; and
analyzing the scene image, so as to estimate a difference between arrival times at the detected listener of:
a direct acoustic signal from the speaker and
a corresponding indirect acoustic signal from the speaker, via the microphone, the audio signal processor and the loudspeaker; and
altering the operating parameter of the audio signal processor, based at least in part on the estimated difference in arrival times.

6. The method according to claim 5, further including altering the operating parameter of the audio signal processor, so as to reduce volume of the loudspeaker, if the estimated difference in arrival times is greater than a predetermined value.

7. The method according to claim 5, further including altering the operating parameter of the audio signal processor, so as to reduce processing by the audio signal processor, if the estimated difference in arrival times is greater than a predetermined value.

8. The method according to claim 1, further including:
estimating at least one attribute of a room, within which the microphone and the speaker are disposed; and
analyzing the scene image, so as to estimate a reverberation time influenced by the at least one attribute; and
altering the operating parameter of the audio signal processor, based at least in part on the estimated reverberation time.

9. The method according to claim 8, wherein the at least one attribute of the room comprises an estimate of at least one of: size of the room and amount of sound-absorbing material within the room.

10. The method according to claim 1, wherein:
the microphone comprises a plurality of microphones, each of the plurality of microphones being associated with a respective potential speaker station;
and further including:
ascertaining absence of a respective speaker at each of the potential speaker stations; and
causing the audio signal processor to ignore audio signals from each microphone that is associated with a potential speaker station having an absent speaker.

11. The method according to claim 1, further including detecting mouth movement by a speaker and estimating a distance between the speaker and the microphone, based at least in part on the detected mouth movement.

12. The method according to claim 1, further including:
detecting a plurality of potential speakers;
detecting mouth movement by at least one of the plurality of speakers; and
causing the audio signal processor to preferentially process audio signals associated with the at least one of the plurality of speakers having detected mouth movement.

13. The method according to claim 1, further including:
detecting an utterance based at least in part on sound signal energy exceeding a threshold value; and
adjusting the threshold value, based on the estimated distance between the speaker and the microphone.

14. The method according to claim 1, further including altering the operating parameter of the audio signal processor before the audio signal processor receives the audio signals from the microphone.

15. A method, comprising:
providing a microphone to detect speech uttered by a speaker and generate audio signals from the speech received by the microphone;
coupling an audio signal processor to the microphone to receive the audio signals and process the received audio signals;
providing a camera that can be at least partially orientated toward the microphone to generate a scene image;
coupling an image analyzer to the camera to automatically analyze the scene image for estimating a distance between the speaker and the microphone; and
coupling a tuner to the image analyzer and to the audio signal processor to automatically alter an operating parameter of the audio signal processor, based at least in part on the estimated distance between the speaker and the microphone;
analyzing the scene image to estimate an orientation of the speaker, relative to the microphone; and
altering the operating parameter of the audio signal processor, based at least in part on the estimated orientation of the speaker, wherein the operating parameter comprises a plurality of gains, wherein each of the plurality of gains is associated with a range of frequencies; and
causing at least one of the plurality of gains, associated with a high range of frequencies ("high-frequency gain"), to be set, relative to another at least one of the plurality of gains, associated with a low range of frequencies ("low-frequency gain"), based on the estimated orientation of the speaker, such that when the speaker is oriented away from the microphone, the high-frequency gain is set higher, relative to the low-frequency gain, than when the speaker is oriented toward the microphone;
detecting a sound-reflecting surface disposed proximate the microphone and the speaker by analyzing the scene image, so as to estimate a ratio of:
sound energy reaching the microphone directly from the speaker and sound energy indirectly reaching the microphone from the speaker after being reflected from the sound-reflecting surface; and
altering the operating parameter of the audio signal processor, based at least in part on the estimated ratio, wherein the audio signal processor comprises an anti-reverberation filter and the tuner to reduce aggressiveness of the anti-reverberation filter when the estimated ratio is less than a predetermined value.

16. An audio system for use by a plurality of speakers, the system comprising:
a microphone configured to detect speech uttered by at least one of the plurality of speakers and generate corresponding audio signals;
an audio signal processor coupled to the microphone to receive the audio signals and configured to process the received audio signals;
a camera orientable at least partially toward the microphone at and configured to generate a scene image;
an image analyzer coupled to the camera and configured to automatically analyze the scene image, so as to detect a gesture by at least one of the speakers; and
a tuner coupled to the image analyzer and to the audio signal processor to automatically alter an operating parameter of the audio signal processor, based at least in part on the estimated distance between the speaker and the microphone;
wherein the system is configured to detect a sound-reflecting surface disposed proximate the microphone and the speaker by analyzing the scene image, so as to estimate a ratio of:
sound energy reaching the microphone directly from the speaker and
sound energy indirectly reaching the microphone from the speaker after being reflected from the sound-reflecting surface; and
alter the operating parameter of the audio signal processor, based at least in part on the estimated ratio,
wherein the audio signal processor comprises an anti-reverberation filter and the tuner to reduce aggressiveness of the anti-reverberation filter when the estimated ratio is less than a predetermined value.

17. A tangible non-transitory computer-readable storage medium with an executable program stored thereon for automatically processing speech uttered by a speaker into a microphone, wherein the program enables a machine to:
detect the speech uttered by the speaker and generating corresponding audio signals;
process the audio signals by an audio signal processor, other than a beamformer;
generate a scene image with a camera;
analyze the scene image, so as to estimate a distance between the speaker and the microphone; and
automatically alter an operating parameter of the audio signal processor, based at least in part on the estimated distance between the speaker and the microphone;
detect a sound-reflecting surface disposed proximate the microphone and the speaker by analyzing the scene image, so as to estimate a ratio of:
sound energy reaching the microphone directly from the speaker and
sound energy indirectly reaching the microphone from the speaker after being reflected from the sound-reflecting surface; and
alter the operating parameter of the audio signal processor, based at least in part on the estimated ratio, wherein the audio signal processor comprises an anti-reverberation filter and the tuner to reduce aggressiveness of the anti-reverberation filter when the estimated ratio is less than a predetermined value.

* * * * *